INVENTOR.
ELLIOTT J. ROBERTS

United States Patent Office 2,796,395
Patented June 18, 1957

2,796,395

ELECTROLYTIC DESALTING OF SALINE SOLUTIONS

Elliott J. Roberts, Westport, Conn., assignor to Dorr-Oliver Incorporated, a corporation of Delaware Application June 5, 1953, Serial No. 359,807

2 Claims. (Cl. 204—151)

This invention relates generally to the purification by desalting of saline solutions or brines such as sea-water and the like. More particularly it relates to improved ways and means for desalting such saline solutions to render them potable or otherwise useable.

It is known to employ certain granular ion exchange resins to effect such desalting treatment. However, such methods are costly because they require large quantities of relatively expensive chemical regenerants. That is to say, according to such known methods, the saline solution is first contacted with a cation exchange resin to remove cations from the salt and then with an anion exchange resin to remove anions from the cation resin product. After the exchange resins become saturated or exhausted by contact with the salt solution they must be regenerated by treatment with an expensive chemical regenerant before they can be reused in the operating cycle. This regeneration of resins as well as other operating steps in the cycle renders this method of desalting commercially unattractive on account of its cost.

It is therefore a principal object of this invention to provide an ionically effective treatment system to produce equivalent results with respect to desalting operations but without the above mentioned factors of cost.

To this end this invention contemplates the use of certain ionically active membranes which, when immersed in an electrolyte in an electrolytic chamber and subjected to the influence of direct current, will selectively transfer certain ions. That is to say, a cation permeable membrane will pass cations while resisting the passage of anions. And an anion permeable membrane will permit the passage of anions while resisting the passage of cations. A thorough discussion of this type of membrane as well as certain applications thereof is contained on pages 845–848 in the September 1952 "Journal of the American Water Works Association." The general composition and preparation of permselective membranes is described by Juda et al. in U. S. Patents 2,636,851 and 2,636,852. Since this invention is concerned with particular methods for using permselective membranes rather than with the membranes themselves, no detailed discussion of the composition or preparation of the membranes will be undertaken.

Briefly, these membranes are to be contradistinguished from granular exchange resins in that the membranes function on the principle of selective ion transfer and are thus not susceptible to saturation, whereas exchange resins operate on the theory of ion exchange and readily become exhausted or saturated with ions. Moreover, ion transfer through the membranes is accomplished by the expenditure of electrical energy rather than by the use of chemical regenerants as in the case of the exchange resins. Thus, ion-transfer membranes are suitable for continuous processes while exchange resins are used mainly in batch processes.

The use of these membranes for desalting or otherwise modifying the concentration of saline solutions in multiple cell electrolytic units has been previously proposed. In such systems an insulated container, fitted with an anode and a cathode, is composed of a plurality of cells formed by alternating anion and cation permeable membranes. Under the influence of direct current anions and cations from half of the cells pass through membranes into adjoining cells from which they are discharged in solution. The net result is the removal of ionic solids from half of the cells and concentration of solutions in the other half. Ionic discharge occurs only at the anode and cathode, thus the principal process is ion transfer within and between the various cells.

Such prior methods, although workable, are nevertheless commercially unattractive because they suffer from the disadvantage that both chlorine gas and free-oxygen are liberated at the anode in varying quantities. This mixed gas liberation makes it virtually impossible to select a commercially practicable anode. Carbon, for instance, is unsuitable because of the fact that it deteriorates in the presence of free oxygen whereas lead is unsuitable because it deteriorates in the presence of chlorine gas.

A further difficulty of the prior system is the fact that many brines, such as sea water, contain significant quantities of both magnesium (Mg) and calcium (Ca) both of which form a very fine and troublesome precipitate upon contact with hydroxyl ions $(OH)^-$. This precipitate will eventually plug up the membrane in any compartment wherein the precipitation occurs thus requiring frequent shutdowns for cleanout and repair.

It is therefore a specific object of this invention to provide improved ways and means for carrying out the purification of brine solutions in accordance with the ion transfer method in which the gases liberated from the anode cell predominate in only one gas thereby rendering the selection of an anode economically feasible. It is a further object of the invention to provide ways and means whereby the precipitation of magnesium hydroxide and calcium hydroxide are eliminated thus avoiding the necessity and cost of frequent shutdowns for cleanout. I have discovered that by supplementing the anode cell with an adjacent auxiliary cell and also supplementing the cathode cell with an adjacent auxiliary cell, then circulating through the resulting four cells a constant quantity of sodium ions in solution, I am able to avoid the liberation of chlorine gas in the anode compartment while concomitantly preventing precipitation and deposition of magnesium and calcium hydroxide.

The object of avoiding mixed gas evolution at the anode is attained by preventing chloride ions from entering the anode cell. This is accomplished by enclosing the anode in a cell having a cation permeable membrane as its inner wall next to the purifying and concentrating section. Since anions cannot pass through this membrane no chloride ions are transferred into the anode cell from the solution undergoing treatment. In order to maintain electrolysis at the anode, an aqueous solution of NaOH, substantially free from chloride ions, is supplied to the anode cell.

Precipitation of hydroxides is avoided by the expedient of preventing hydroxyl ions from co-existing in the same cell with magnesium or calcium ions. This, I accomplish by a novel operating arrangement. The cathode is enclosed in a cell having a cation permeable membrane as its inner wall. Adjacent the cathode cell is a cathode auxiliary cell defined on one side by the cation permeable membrane of the cathode cell wall and on the other side by an anion permeable membrane.

An electrolytic solution, such as an aqueous solution of NaCl, substantially free from calcium, magnesium and hydroxyl ions, is supplied to the cathode auxiliary cell.

In this cell the electric current causes the anions (principally chlorides) to pass through the anion permeable membrane into an adjacent concentrating cell while the cations (principally sodium) pass through the cation-permeable membrane into the cathode cell where they form an aqueous NaOH solution during the electrolytic liberation of hydrogen gas. Inasmuch as the electrolytic solution supplied to the auxiliary cell initially contains neither undesirable cations ($Ca^{++}$ or $Mg^{++}$) nor undesirable anions $(OH)^-$ which receives cations from the cathode auxiliary cell, or in the concentrating cell which receives anions from the cathode auxiliary cell.

In brief, my process revolves about the concept of providing a system having an anode and a cathode. A cation permeable membrane is provided adjacent the cathode and defines a cathode cell. An anion permeable membrane is provided adjacent the cation permeable membrane and defines an auxiliary cell between the two membranes, said cell being adjacent to the cathode cell.

A cation permeable membrane is also provided adjacent the anode defining an anode cell. An anion permeable membrane is provided adjacent this cation permeable membrane defining an auxiliary cell adjacent the anode cell.

For purposes of this specification the cathode cell and its auxiliary cell are designated as the cathode cell section while the anode cell and its auxiliary cell are designated as the anode cell section.

Between the cathode cell section and the anode cell section and adjacent thereto there is provided a purifying and concentrating section comprising a plurality of cells defined by alternating cation-permeable and anion-permeable membranes so arranged that each end of the purifying and concentrating section is defined by the anion-permeable membranes defining the inner walls of the auxiliary cells. In short, there is provided between the anode and cathode cell sections, pairs of concentrating and purifying cells.

Electrolyte in solution is supplied to each of the cells in both the anode cell section and the cathode cell section. In order to prevent the evolution of chlorine gas at the anode, the solution supplied to the anode cell must be substantially free from chloride ions. An aqueous solution of technical grade NaOH will meet this requirement. In the anode cell the hydroxyl ion is removed by electrolysis with the evolution of oxygen gas while the sodium ion passes through the cation permeable membrane into the adjacent auxiliary cell where it goes into solution with anions (principally chlorides) coming from the purifying and concentrating section.

In order to prevent the formation of insoluble hydroxides it is necessary that no hydroxyl ions co-exist in any cell with magnesium or calucium ions. To this end then, an electrolyte free from hydroxyl, calcium, or magnesium ions is supplied to the cathode auxiliary cell. A clarified aqueous solution of technical grade NaCl will usually meet this requirement, but in some cases it may be necessary to pretreat the solution by adding NaOH and $Na_2CO_3$ and then clarifying. The anions (principally chlorides) pass through the anion permeable membrane into the adjacent concentrating cell where they go into solution with cations entering from an adjacent purifying cell. Cations (principally sodium) leave the cathode auxiliary cell through the cation permeable membrane and enter the cathode cell where upon electrolysis in that cell they form NaOH with the concomitant evolution of hydrogen gas.

It is a feature of this invention that the cells in the anode and cathode cell sections can be operated in a continuously repeating cycle using a single circulating body of electrolyte. In such a case, a constant quantity of sodium ions in solution is circulated between the anode and cathode cell sections, the passage being from the anode cell to the anode auxiliary cell thence from the anode auxiliary cell to the cathode auxiliary cell and thence to the cathode cell. This constant circulation of electrolyte through the two cell sections provides a unitary system whereby the danger of mixed gas evolution at the anode is minimized and undesirable precipitation of hydroxides in the system is eliminated. Moreover, the necessity for the constant addition of special electrolyte is avoided because of the fact that the circulating electrolyte always possesses the requisite characteristics for each particular cell through which it passes. That is to say, during passage through the anode cell section, the circulating solution is automatically conditioned for its role in the cathode cell section and vice versa.

For instance, solution passing through the anode cell section loses its hydroxyl ions and picks up chloride ions instead and is thus suited for its role in the cathode cell section. Solution passing through the cathode cell section loses its chloride ions and picks up hydroxyl ions in the form of NaOH and is thus suited for its role in the anode cell section.

By referring to the anions as chlorides I do not mean to say that the feed solution will contain only chlorides. Obviously, all anions (sulfates, etc.) will transfer through the membranes with the chlorides and will be disposed of in the same manner.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

Figure 1:
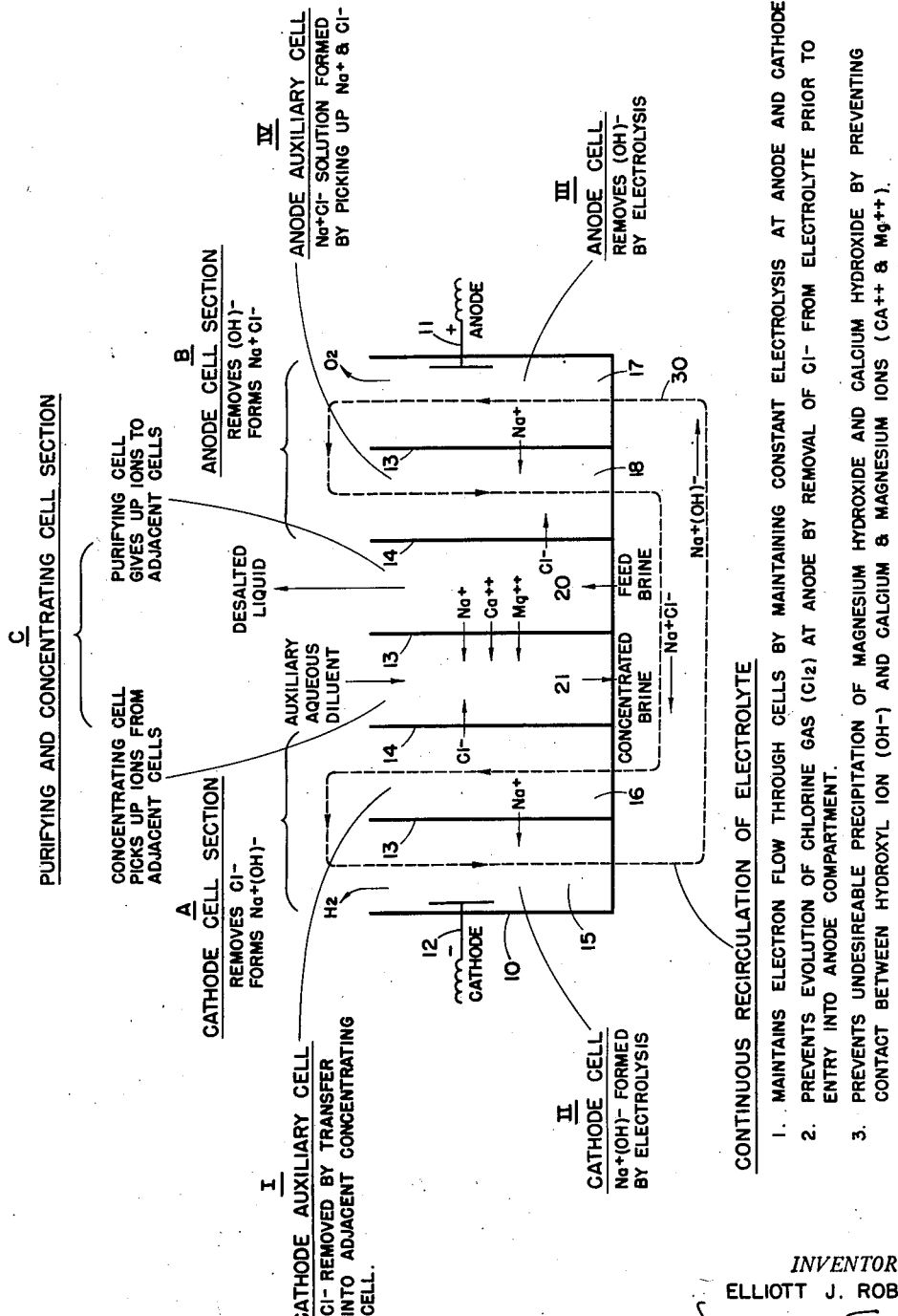
Figure 1 is a simplified line drawing of a simple multi-cell unit depicting with clarity the function of the continuous recirculation of electrolyte between the anode cell section and the cathode cell section.

In Figure 1 there is shown insulated chamber 10 provided with an anode 11 and a cathode 12. Interposed between the anode and cathode is a series of cells alternating between cation permeable membranes 13 and anion permeable membranes 14. The cells thus formed include the cathode cell 15, cathode auxiliary cell 16, anode cell 17 and anode auxiliary cell 18. The cathode cell together with its auxiliary cell is designated as cathode cell section (A) while the anode cell together with its auxiliary cell is designated as anode cell section (B).

Located between the anode cell section and the cathode cell section is the purifying and concentrating cell section (C) comprising a purifying cell 20 and a concentrating cell 21. The membrane arrangement is such that there are cation permeable membranes next to both the anode cell and the cathode cell so that the inner walls of the anode and cathode cells are defined by cation permeable membranes. This membrane arrangement, in connection with the hereinafter discussed recirculation of electrolyte is critical to the operation of my invention.

Continuous recirculation of electrolyte between the anode cell section and the cathode cell section is made in accordance with the flow shown by dotted line 30. This recirculation of electrolyte in conjunction with the operation of the auxiliary cells forms the basis for the operation of my invention. It is known that the operation of the purifying and concentrating cells is dependent upon a constant flow of current through those cells in order to effect the desired ion transfer out of the purifying cell 20 into the adjacent concentrating cell 21 and also in the adjacent auxiliary cell 18. In order to maintain this constant current flow it is necessary to maintain constant electrolysis at the cathode and at the anode. It is also necessary to prevent the liberation of chlorine gas at the anode in order to avoid the deleterious effects of such chlorine gas on the anode itself and also on the membrane adjoining the anode cell. And it is further necessary to prevent the formation of insoluble hydroxides such as magnesium hydroxide and calcium hydroxide because these precipitates will not only cause solid impurities in the concentrated solution but will also tend to plug the pores of the membranes and cause difficulty within the cells themselves. This latter is accomplished by my flow arrangement which assures that the hydroxyl ions do not come in contact with calcium or magnesium ions.

Operation of the cells may be best described by referring first to the purifying and concentrating section and in particular to purifying cell 20. The incoming feed brine passes upwardly through cell 20 and during its passage therethrough the cations transfer through membrane 13 into adjacent concentrating section 21 while the anions transfer through membrane 14 into auxiliary cell 18. The result is that salts are substantially removed from the incoming brine and the desalted liquid is subsequently discharged as product.

In cell 21 the abstracted or transfer ions are picked up and washed out of the system by a smaller supply of liquid which may be brought in from an auxiliary source or may be part of the product recycled as desired.

As can be seen, none of the cations of the incoming feed are allowed to enter either the anode cell section or the cathode cell section, therefore, the calcium and magnesium ions are unable to contact the hydroxyl ions which exist only in the anode and the cathode cell. A solution of electrolyte, free from calcium and magnesium ions is continuously recirculated, as indicated by flow line 30, between the anode cell section and the cathode cell section. Briefly, the function of this continuously recirculating electrolyte may be described by following steps I through IV in Figure 1. In cathode auxiliary cell 16 (step I) the solution of sodium chloride has its ions removed by ion transfer with the chloride being transferred into the concentrating cell 21 for removal from the system while the sodium is transferred into the cathode cell (step II) where electrolysis forms sodium hydroxide while liberating hydrogen gas. The resulting sodium hydroxide, which is now free from chloride ions, is then transferred to the anode cell (step III) where the hydroxyl ions are removed by electrolysis with the concomitant evolution of oxygen. At the same time the sodium ions are transferred by ion transfer into adjacent auxiliary cell 18 (step IV) where they join chloride ions coming into the auxiliary cell from purifying cell 20. The resulting NaCl solution is then recirculated again in exactly the same manner as previously described.

As can be seen, the gas evolved at the anode is substantially pure oxygen, therefore, the difficulties encountered due to mixed gas evolution ($Cl_2$ and $O_2$) are eliminated and the selection of a commercially practicable anode becomes possible. It is possible, of course, that there will be some leakage of chloride ions into the anode compartment, however, the quantity of leakage and the subsequent chlorine gas evolution will be so slight that their effect will be negligible.

Figure 1 shows only two cells in the purifying and concentrating cell section, however, it is to be understood that for practical operation the purifying and concentrating cell section will doubtless comprise many pairs of cells and probably as many as 100 or more pairs of cells.

Figure 2:
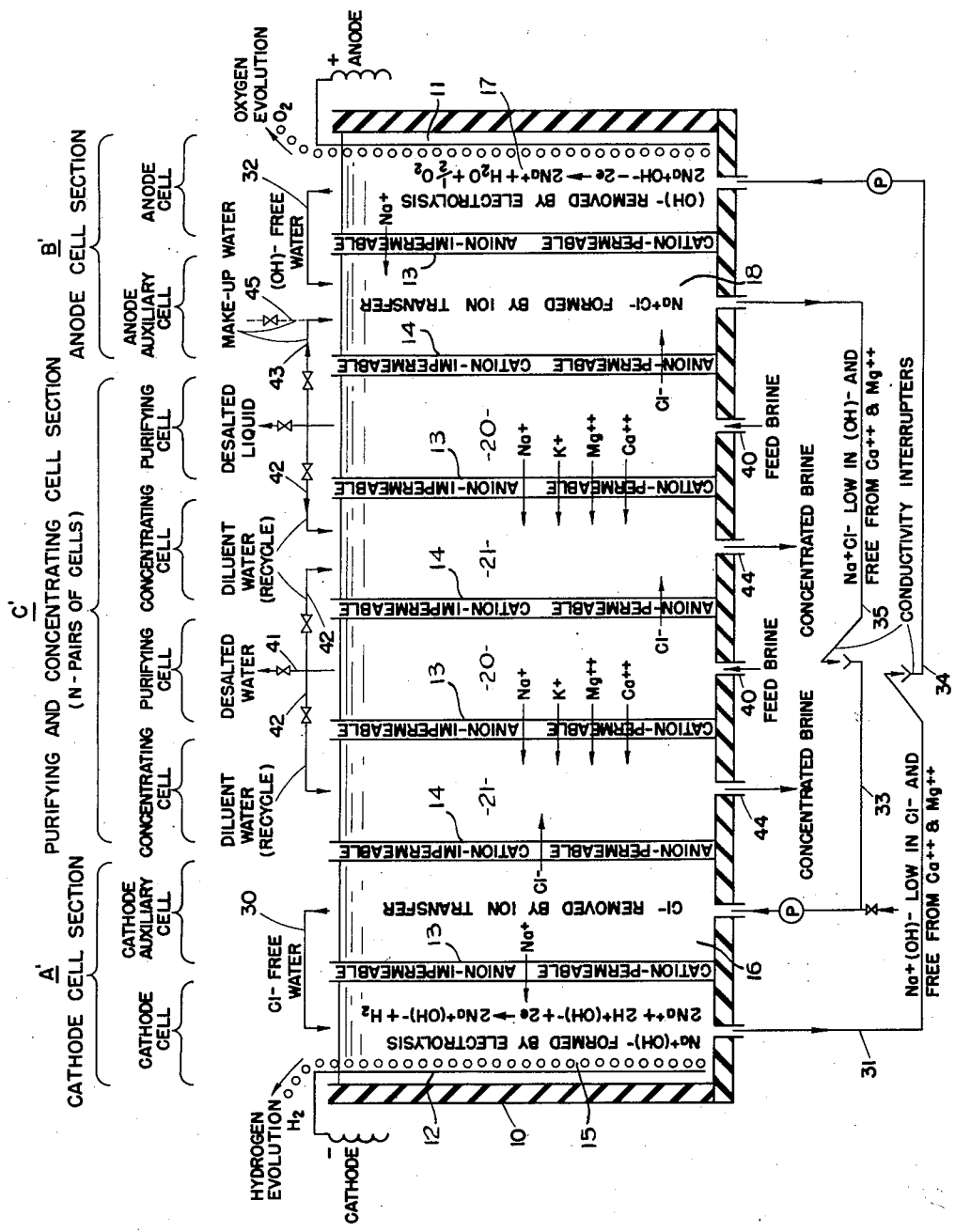
Figure 2 is a more detailed diagram further illustrating the theory of operation of my invention.

In Figure 2 there is shown an insulated chamber 10 provided with an anode 11 and a cathode 12. Interposed between the anode and cathode is a series of cells formed between alternating cation permeable membranes 13 and anion permeable membranes 14. The cells thus formed include the anode cell 15, anode auxiliary cell 16, cathode cell 17 and cathode auxiliary cell 18. The anode cell together with its auxiliary cell is designated the anode cell section (B') while the cathode cell with its auxiliary cell is designated the cathode cell section (A').

Located between the anode cell section and the cathode cell section is the purifying and concentrating cell section (C') comprising a plurality of alternately disposed purifying cells 20 and concentrating cells 21. The membrane arrangement is such that there are cation permeable membranes next to both the anode and the cathode so that the inner walls of both anode and cathode cells are defined by cation permeable membranes. This membrane arrangement is critical to the operation of my invention because only by this arrangement in connection with the hereinafter discussed recirculation of electrolyte am I able to eliminate chlorine gas evolution at the anode while concomitantly preventing the precipitation of undesirable hydroxides.

Continuous recirculation of electrolyte solution between the anode cell section and the cathode cell section is provided by means of transfer lines 30, 31, 32 and 33. Transfer lines 31 and 33 are equipped with special "conductance interrupting" arrangements such as shown symbolically at 34 and 35, to prevent short circuiting of current between the anode cell section and the cathode cell section.

The brine to be purified enters the purifying cells via feed inlets 40 passing upwardly through the cells to discharge by appropriate means at the top. Purified water leaving the purifying cell is discharged via appropriate conduit 41 with part of the water being recycled as diluent water via conduit 42 into the top of adjacent concentrating cells through which the water passes downwardly picking up ions transferred into the concentrating cell from the adjacent purifying cells and finally the solution passes out the bottom of the concentrating cells via conduit 44. Inasmuch as only a part of the purified water is recycled, it follows that the concentration obtainable in the concentrating cell is a direct function of the efficiency of the purifying cell as well as of the relative quantity of water recycled through the concentrating cells.

During operation of the unit there will be constant evolution of oxygen gas at the anode and hydrogen gas at the cathode. This evolution of gas will deplete water from the system and therefore some means must be provided to make up for the water thus lost. This make-up water can be recycled from the purifying cell via conduit 43 or supplied directly from an outside source via conduit 45.

*Operation*

To start up, the anode cell and the cathode cell are both filled with solutions of technical grade sodium hydroxide while the cathode auxiliary cell and the anode auxiliary cell will both be filled with solutions of technical grade sodium chloride. The intervening cells will initially be filled with feed brine.

When the circuit is closed and electron flow is initiated between the cathode and anode, electromotive force will operate on the ions present in the various cells and cause their transfer as indicated by the arrows with the anions from the purifying cell passing through the anion permeable membrane into the adjacent concentrating cell while the cations from the purifying cell pass through the cation permeable membrane into the oppositely adjacent concentrating cell. Under conditions of continuous flow the solutions in the purifying cells will be flowing countercurrently to the solutions of the concentrating cells. Thus, it is assured that there will be a relatively constant concentration drop between solutions in adjacent cells at any given depth in the cell. No chemical or electrolytic reactions occur in any of the concentrating or purifying cells. The only action taking place in those cells is the transfer of ions under the influence of electromotive force to effect the purifying of the solution by removal of the ions and the concentration of solution in adjacent cells by transferring ions into a lesser quantity of liquid in such cells.

Although I have shown countercurrent flow within the various cells I do not wish to be limited to this arrangement because obviously the process can be carried out with solutions in all cells flowing in the same direction. Also, the diluent or wash water used to sweep ions out of the concentrating cells may be brought in from an outside source rather than recycled from the purifying cells.

In the anode cell section sodium hydroxide is being decomposed in the anode cell in accordance with the equation

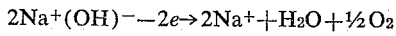

$$2Na^+(OH)^- - 2e \rightarrow 2Na^+ + H_2O + \tfrac{1}{2}O_2$$

This reaction, if properly conducted, will result in substantially complete removal of $(OH)^-$ by electrolysis while the $Na^+$ is transferred under the influence of electromotive force into the adjacent auxiliary cell. The liberated oxygen gas is discharged from the anode compartment while the resulting water, now free from $(OH)^-$, is transferred via conduit 32 into the anode auxiliary cell. During passage through this cell sodium chloride solution is formed due to the presence of both $Na^+$ and $Cl^-$. This solution is free from $Mg^{++}$ and $Ca^{++}$ because none of these ions have ever had an opportunity to enter the auxiliary cell. The resulting $Na^+Cl^-$ solution is transferred via conduit 33 into the cathode auxiliary cell where the water is purified by ion transfer. In this cell there is substantially complete removal of the $Cl^-$ so that none of these chloride ions are free to eventually return to the anode compartment. The purified water, now free from $Cl^-$ is transferred from the cathode auxiliary cell via conduit 30 into the cathode cell. In the cathode cell hydrogen gas is liberated and sodium hydroxide is formed by electrolysis in accordance with the following equation

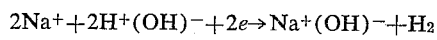

$$2Na^+ + 2H^+(OH)^- + 2e \rightarrow Na^+(OH)^- + H_2$$

The resulting sodium hydroxide solution is then recycled via conduit 31 to return to the anode cell to maintain electrolysis therein.

By this continuous recirculation of electrolyte between the anode cell section and the cathode cell section it is assured that there will be no liberation of chlorine gas from the anode while at the same time it is also assured that there will be no precipitation of hydroxides due to the combination of magnesium or calcium ions with hydroxyl ions because at no time do these ions co-exist in the same cell.

During operation there will be continuous loss of water, as $H_2$ and $O_2$, from the electrolyte recirculating between the two cell sections. This loss can be made up either by water brought in from an independent source via conduit 45 or by recycling product water discharged from the adjacent purifying cell.

The degree of purification obtainable depends upon the flow rate through the unit and the electromotive force available for ion transfer and also upon the efficiency of the membranes in their ability to selectively transfer ions. The degree of concentration obtainable in the concentrating cells depends, of course, upon the foregoing factors controlling the degree of purification obtainable and, in addition, it depends upon the quantity of sulfates initially present in the feed brine because care must be taken that the maximum saturation of sulfates is not exceeded in the concentrating cells lest undesirable precipitates form.

Additional operating limitations will be imposed by the inherent limitations of the membranes themselves. In this connection, it is noted that permselectivity, or the ability of the membranes to selectively transfer only ions of a certain sign, depends to a great extent upon the concentration of the solutions with which the membranes are used. As a general rule permselectivity decreases as the concentration of surrounding electrolytes increases so that the danger of leakage of ions of the opposite sign increases as the concentration of surrounding solutions increases. Care must be taken that the concentrations in the various cells do not become so great that undesirable ion leakage occurs. It will also be wise to make certain that the solutions recirculated between the cathode cell section and the anode cell section are maintained relatively dilute in order to prevent undesirable ion leakage.

When the system is used in connection with the desalting of sea water it may in some cases be advisable to pretreat the incoming feed with lime in order to remove carbonates and thus eliminate the danger of any carbonate precipitation within the system.

In the drawings, cells are shown as having relatively wide spaces between the membranes, in practice, however, it has been found beneficial to have the membranes placed close together thus making the cells very small, say 2–6 millimeters in width. Also it is to be understood that the number of cells in the purifying and concentrating section should be many times those shown in the drawings. In fact, maximum economy may require that there be a hundred or more pairs of cells in the purifying and concentrating section. This is so because of the fact that electrolysis occurs only at the anode and cathode and that the rest of the process, which involves only ion transfer, occurs in the intervening cells. Thus, it follows that the greater the number of cells the smaller will be the equivalents of water decomposed by electrolysis for each equivalent of salt removed from the water passing through the purifying and concentrating section.

Figure 3:
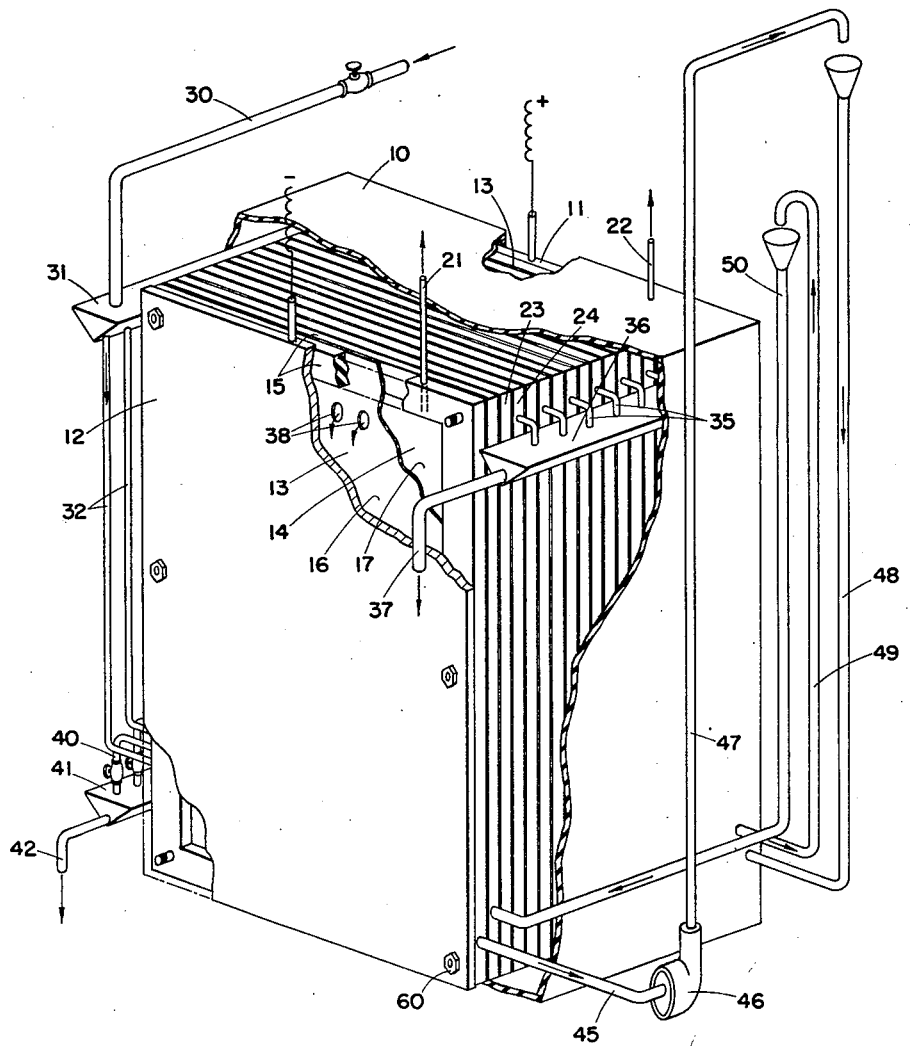
Figure 3 shows a preferred embodiment of my invention adapted for commercial use.

Referring now to Figure 3: Figure 3 is a partial cutaway perspective view showing a commercial embodiment of my invention.

In Figure 3 there is shown an insulated chamber 10 cut-away to show the internal details of construction. At opposite ends of the insulated container there is an anode 11 and a cathode 12. Interposed between the cathode and anode are a plurality of membranes spaced from the cathode and anode and from each other, beginning with a cation permeable membrane 13 and an anion permeable membrane 14 thence alternating cation and anion permeable membranes ending with a cation permeable membrane 13 adjacent the anode plate. The membranes are spaced from each other and from the cathode and anode by a plurality of spacers such as at 15. Thus there is defined a unit divided into a plurality of cells including the cathode cell 16 defined between cathode plate 12 and membrane 13 and cathode auxiliary cell 17 defined between cation permeable membrane 13 and anion permeable membrane 14 which are spaced from one another by spacer 15. At the opposite end of the unit there is similarly defined an anode cell and an anode auxiliary cell.

A source of direct current is provided for supplying current to the unit.

A vent 21 is provided leading from the cathode cell for discharging evolved hydrogen gas and a vent 22 is provided leading from the anode cell for evolving oxygen gas.

Interposed between the anode auxiliary cell and the cathode auxiliary cell is a plurality of purifying cells 23 and concentrating cells 24. The interior of these cells cannot be seen from the drawings but they are formed by the spaces between the permselective membranes.

Feed solution to be purified or concentrated is supplied to the unit via valved conduits 30 which discharge into the common header or trough 31 from whence the feed solution flows via conduits 32 into the various purifying cells, there being one such conduit 32 for each purifying cell 23. Short circuiting of current through the liquid in feed trough 31 is minimized by the fact that conduits 32 are long and have a very small inside diameter and so offer a very high resistance as compared to the resistance offered by the cells themselves. The feed solution passes upwardly through the cells having its ions removed during its upward passage and when it reaches the top of the cells it is either all discharged as product water via conduit 35, common trough 36 and discharge conduit 37; or a portion of it is recycled to act as wash water in the adjacent cells via overflow openings in the membranes such as those shown at 38.

This wash water in passing downwardly through concentrating cells 24 discharges from the concentrating cells via valved conduits 40 there being one such conduit for each concentrating cell. These discharge conduits drip or flow in interrupted stream into a common trough 41 from which the concentrated brine is discharged via conduit 42. Regulation of the rate of discharge from conduits 40 controls the rate and quantity of recycle water and so controls the concentration of the liquid discharged from the concentrating cells.

The overflow arrangement shown in membrane 13 is identical to that used for overflowing a regulated quantity of liquid through the purifying cells for recirculation through the washing cells. The quantity of overflow being regulated by coordinating the quantity of concentrated brine discharged at 40 in cooperation with the quantity of the feed supplied via conduit 30.

Recirculation between the cathode cell, the anode cell, the anode auxiliary cell, and the cathode auxiliary cell is provided by means of transfer conduit 45 which removes solution from cathode cell 16, and passes it through pump 46 and conduit 47 to discharge with interrupted flow into open ended receiving conduit 48 through which it flows to enter the anode cell at the opposite end of the unit. The solution passes up through the anode cell and is discharged via overflow openings in its membrane and passes into its adjacent auxiliary anode cell through which it flows downwardly to exit via conduit 49 and discharges into open ended conduit 50 for return under the influence of hydrostatic force into the cathode auxiliary cell 17. The solution then passes upwardly through the cathode auxiliary cell and overflows into the cathode cell 16. This cycle is continuously repeated so that there is continuously maintained a constant quantity of sodium ions recirculating through these four cells. In this connection, it should be noted that only one side of cell 17 is provided with overflow outlets 38 in order to assure that all of the liquid is recycled through overflow openings 38.

During operation there will be a constant loss of water from the solution recirculating between the end cells. This loss of water will be due to the evolution of hydrogen gas at the anode and cathode and must be made up in order to keep the solution up to proper volume and strength. This water loss can be compensated for either by adding make up water from an outside source through a conduit, not shown, leading directly into the anode auxiliary cell or it may be recycled from adjacent purifying cells through an arrangement of transfer openings such as those shown at 38. This choice will depend upon engineering expedience and either method is within the scope of operation of the invention.

It is important in operation that the solutions flowing into open ended conduits 50 and 48 pass across an open space preferably intermittently in order to prevent the loss of efficiency due to short circuiting of the solution carried through the conduits.

As shown in the drawings, the electrodes, spacers and membranes are suitably held together by bolts such as shown at 60.

Although Figure 3 shows a relatively limited number of cells interposed between the anode and cathode cells it is to be understood that a commercial unit will have many more cells than shown and in fact may have 100 or more pairs of cells. However, Figure 3 has been purposely simplified in order to make it more readily understandable.

Suitable materials of construction for the plate and the membrane spacers will be readily available, their only requirement being that they insulate and give structural support for the membranes which they hold in place. Similarly, the electrodes need not be an entire plate as shown, but may be merely an electrode inserted in a cell between a cation permeable membrane and an insulated outer wall. The cathode may be made up of stainless steel or other material suitable as an electrode in the presence of a strong electrolyte for the evolution of hydrogen gas and the anode may suitably be constructed from lead or other material suitable for the electrolytic evolution of oxygen gas in the presence of sodium hydroxide.

In order to prevent undue mechanical agitation within the anode and cathode cells, it may be advisable to provide additionally a porous asbestos membrane surrounding the electrodes. This membrane will tend to guide the evolved gas directly to discharge and prevent mechanical agitation of the solution by them. This will be especially important in the anode cell where agitation may cause hydroxyl ions to be rushed through the cell to overflow into the auxiliary cell thence to cause precipitation in subsequent cells.

*Example*

The following covers a typical example of the contemplated mode of practicing this invention in a multi-cell unit utilizing the critical arrangement of permselective membranes specified by this invention. Membranes may be of any suitable type such as described by Juda et al. in U. S. Patent 2,636,851 or in the book "Amberplex Ion Permeable Membranes" (1952) published by the Rohm and Haas Company of Philadelphia, Pennsylvania.

A commercial unit similar to that shown in Figure 3 with a capacity of 30 gallons per minute of product water from sea water will comprise a unit containing 204 individual cells formed by membranes extending transversely across the basic tank. These cells include a cathode cell, cathode auxiliary cell, anode cell and anode auxiliary cell, plus 200 intervening cells of which 100 will be desalting cells and 100 will be concentrating cells. The membranes are spaced 4 mm. apart and each membrane will have an area of 200 sq. ft.

Sea water at an electrolyte concentration of about 3% is supplied to the purifying cells and the waste discharge from the concentrating cells is so regulated that the concentrated brine contains about 8% salts in solution. An electrolyte solution of NaOH—NaCl is continuously recirculated through the end cells as shown in Figure 1. The strength of this circulating solution is regulated so that maximum concentration in the end cells (cathode cell, auxiliary cell, etc.), will be maintained considerably lower than the concentration of the feed and preferably on the order of 1% at the point of maximum concentration and substantially zero at the point of minimum concentration in the cells. In order to attain this concentrtaion it will be necessary to maintain the circulation rate among these cells at about 3 times the flow rate of the incoming feed.

In the unit described, the potential drop from cathode to anode will be approximately 26 volts and, for producing 30 gallons per minute of product water a current of 1340 amps. will be required.

By recirculating in this manner contact between the magnesium and calcium ions of the sea water with the hydroxyl ions is avoided so that troublesome precipitates do not form.

This voltage should remove 98.5% of the salts from the incoming sea water thus yielding a product having approximately 450 p. p. m. of salts. Water of this purity is potable and is suitable for most commercial uses and also for irrigation purposes.

Of course, the voltage can be increased to give more capacity at a sacrifice in operating efficiency.

In the case of treating a feed solution having a lower concentration than sea water, the current requirement will be correspondingly decreased and therefore the power consumption will be less.

I claim:
1. The continuous process of electrolytically de-salting a feed salt solution containing precipitable cations significantly $Ca^{++}$ and $Mg^{++}$ objectionable at the cathode as well as interfering anions significantly $Cl^-$ objectionable at the anode and significantly containing NaCl in solution, which process comprises subjecting the feed solution to electrolytic treatment in a direct-current supplied electrolytic cell system having an anode and a cathode, and a plurality of at least five perm-selective membranes constituting a series functionally interposed between said cathode and said anode and spaced from said cathode and said anode as well as from one another to define a corresponding plurality of at least six operating cells, in which the outer membrane at each end of said series is cation-permeable and the membranes of the entire series are cation-permeable and anion-permeable in alternating arrangement, said cell system thus comprising a gas-evolving cathode cell for said cathode, and a gas-evolving anode cell for said anode, a cathode auxiliary cell adjoining said cathode cell and functionally associated therewith through the one cation-permeable end membrane, an anode auxiliary cell functionally associated with said anode cell through the other cation-permeable end membrane, and at least one pair of working cells interposed between said auxiliary cells for continuously de-salting said feed salt solution, namely a de-salting cell proper functionally associated with said anion auxiliary cell through a common anion-permeable membrane of said series, and a salt-concentrating and concentrate removing cell functionally associated with said de-salting cell through a common cation-permeable membrane of said series, and functionally associated with said cathode auxiliary cell through another anion-permeable membrane common to both said concentrating cell and said anode auxiliary cell; which said treatment comprises supplying feed salt solution to said de-salting cell for abstracting salt cations and anions from said feed solution, supplying diluent liquid to said concentrating cell to remove from the system the equivalent of the abstracted salt, supplying to said anode auxiliary cell aqueous auxiliary influent liquid in the form of substantially pure water substantially free from precipitable cations and from interfering anions to produce therefrom auxiliary effluent solution carrying cations and anions significantly as NaCl in solution, transferring and supplying such NaCl bearing auxiliary effluent solution to said cathode auxiliary cell to produce therefrom auxiliary effluent liquid substantially free from said NaCl, supplying to said cathode cell aqueous auxiliary influent liquid in the form of substantially pure water substantially free from precipitable cations and interfering anions to produce therefrom cathode cell effluent solution carrying cations and anions significantly as Na(OH), transferring and supplying such Na(OH) bearing effluent solution to said anode cell to produce anode cell effluent liquid substantially free from said Na(OH), whereby electrolytic operating balance is satisfied with the feed solution in the de-salting cell losing its cations into the adjoining concentrating cell and its anions into the adjoining anode auxiliary cell, the diluent liquid in the concentrating cell receiving for disposal said cations from the de-salting cell and the equivalent of said anions from the adjoining cathode auxiliary cell, the auxiliary liquid in the anode auxiliary cell receiving the anions significantly Cl from the adjoining de-salting cell and the equivalent of the cations as non-precipitable cations significantly $Na^+$ from the adjoining anode cell, and the auxiliary liquid in the cathode auxiliary cell losing anions significantly Cl into the concentrating cell and losing a corresponding quantity of non-precipitable cations significantly $Na^+$ into the adjoining cathode cell, so that substantially pure water emerges as effluent liquids from the cathode auxiliary cell as well as from the anode cell, said effluent liquids being adapted to provide a quantity of said substantially pure water influent liquids for the anode auxiliary cell and for the cathode cell.

2. The process according to claim 1, which comprises establishing a cyclic flow path of said auxiliary liquids, namely from the cathode cell through the anode cell, through the anode auxiliary cell, through the cathode auxiliary cell, and into and through said cathode cell, whereby the liquid in said cyclic path appears in sequence substantially as NaCl entering the cathode auxiliary cell, substantially as Na(OH) entering the anode cell, substantially as pure water entering the cathode cell, and substantially as pure water entering the anode auxiliary cell, and introducing into said cyclic flow path a quantity of substantially pure make-up water sufficient to replace the water lost by electrolysis.

References Cited in the file of this patent

UNITED STATES PATENTS

| | | |
|---|---|---|
| 2,636,851 | Juda et al. | Apr. 28, 1953 |
| 2,694,680 | Katz et al. | Nov. 16, 1954 |

OTHER REFERENCES

Langelier: "Journal of American Water Works Assn.," September 1952, pages 845–848.